United States Patent

Scott

[15] 3,665,633
[45] May 30, 1972

[54] FISHING APPARATUS

[72] Inventor: Leonard E. Scott, 824 Norfolk Ave., Westchester, Ill. 60153

[22] Filed: June 24, 1970

[21] Appl. No.: 49,267

[52] U.S. Cl. ............................................................43/19.2
[51] Int. Cl. ......................................................A01k 87/00
[58] Field of Search....................................................43/19.2

[56] References Cited

UNITED STATES PATENTS

| 3,422,561 | 1/1969 | McLean | 43/19.2 |
| 3,001,317 | 9/1961 | Boughton | 43/19.2 |
| 2,758,407 | 8/1956 | Speidell | 43/19.2 |

*Primary Examiner*—Lucie H. Laudenslager
*Attorney*—Rummler & Snow

[57] ABSTRACT

An apparatus having a holder for supporting and retaining one end of a fishing pole, the apparatus including a mechanism operative to drive the holder and impart thereto a particular cyclic swinging motion to the pole, the mechanism also producing at one part of the cycle a whipping action on the line at the free end of the pole.

10 Claims, 12 Drawing Figures

Patented May 30, 1972 3,665,633
2 Sheets-Sheet 1
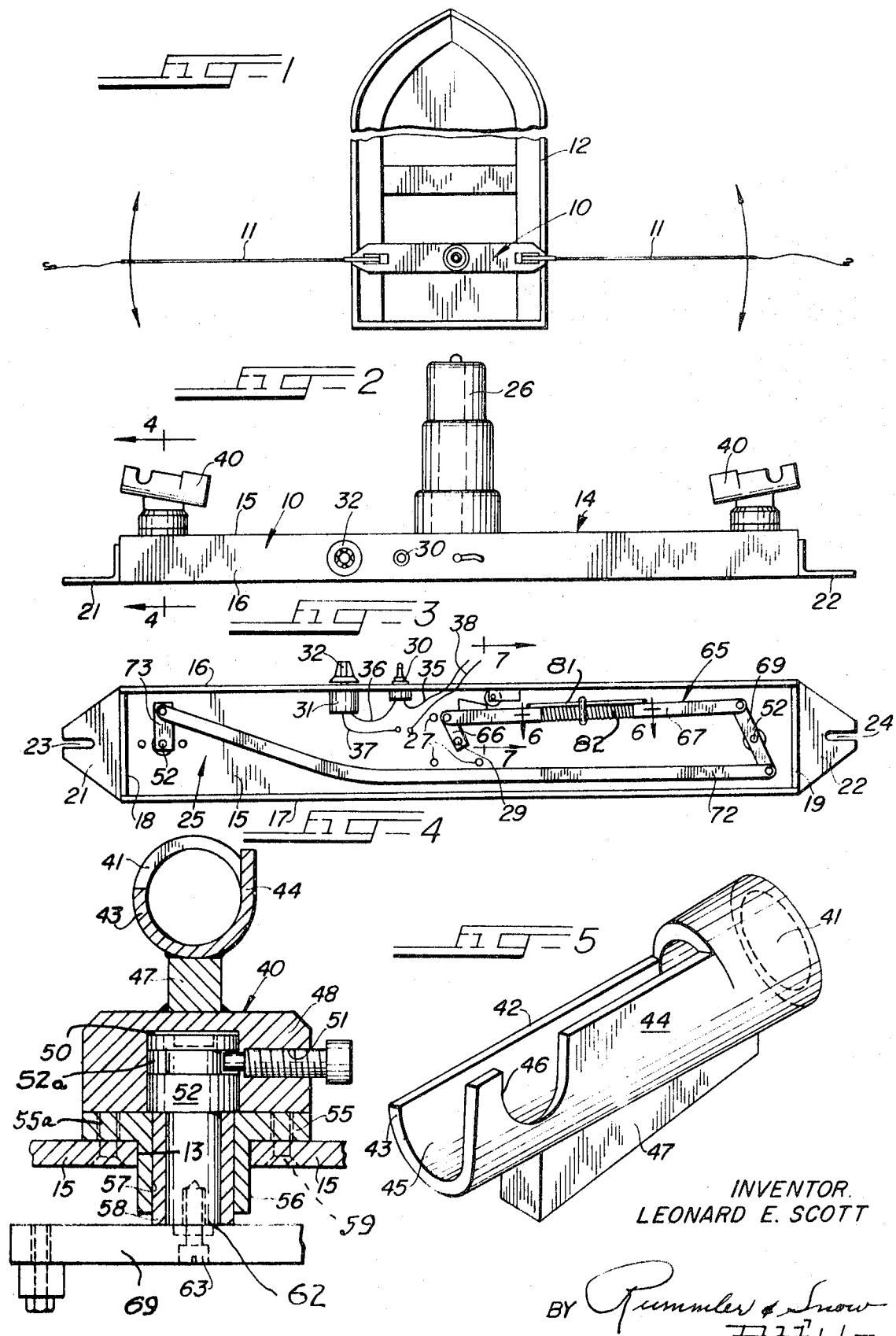
INVENTOR.
LEONARD E. SCOTT
BY Rummler & Snow
ATTYS

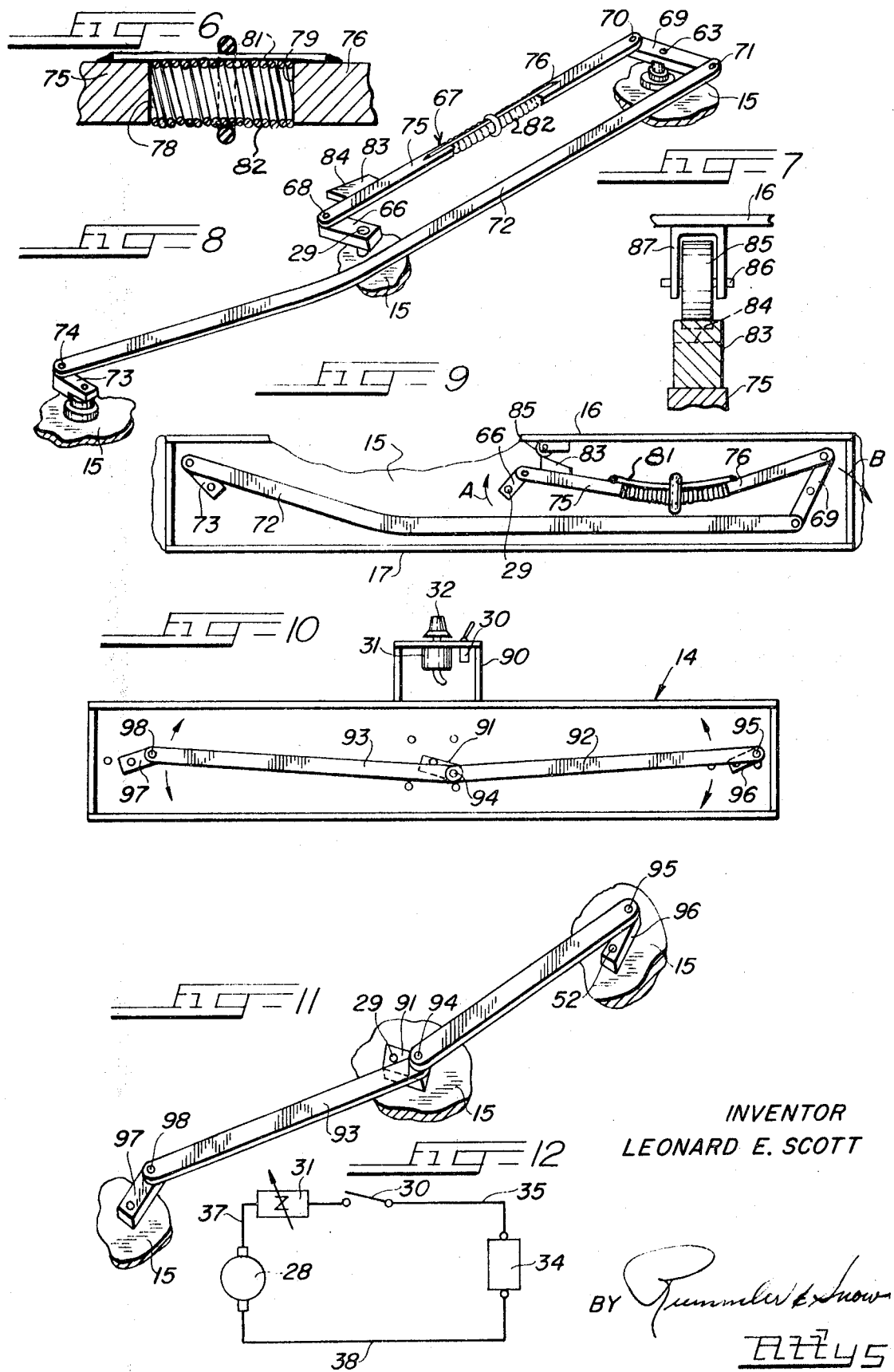

FISHING APPARATUS

BACKGROUND OF THE INVENTION

The instant invention relates to an apparatus adaptable for use with a fishing pole of the type usually associated with still fishing and is operative to impart motion or action to the pole which is transmitted to an associated bait or lure. It has long been known that some fish are attracted to lures having particular movements or actions as they are retrieved during casting, fly fishing or trolling. However casting and fly fishing require specialized equipment, and the action and movement of the lures are subjectively dependent on the particular expertise of the operator. Trolling on the other hand merely involves the pulling of the lure through the water from a boat at a distance therefrom where the speed and direction of the lure is normally that of the boat. On the other hand the ordinary and relatively inexpensive fishing pole is usually used as a still fishing instrument since imparting movement or action to bait or lures used therewith would require constant attention and effort by the operator.

A broad object of the invention is to provide an apparatus operative to hold and swing a fishing pole in such a manner that movement and action is imparted to the bait or lure associated therewith.

An object of the invention is to provide that the apparatus have a holder for retaining and supporting the fishing pole at one end thereof wherein the holder is operative to impart a cyclic swinging motion to the pole.

A still further object of the invention is to provide that the apparatus incorporate a drive mechanism connected to the holder which is driven by an electric motor such that the frequency of the swinging movement of the pole can be selectively controlled.

Still another object of the invention is to provide that the apparatus have a pair of spaced apart holders each swingingly driven by the drive mechanism.

A more specific object of the foregoing is to provide that the apparatus is mountable on a boat wherein the poles can be respectively disposed to the port and starboard thereof.

Another object of the invention is to provide another embodiment with a mechanism operative to produce a swinging and whipping action on the pole by driving the holder in a particular manner.

Another object of the foregoing is to provide that the above mentioned embodiment incorporate a plurality of holders each driven such that the swinging and whipping action is transmitted to each of them.

A more specific object of the foregoing is to provide that the embodiment have the mechanism driven by an electric motor controllable such that the frequency and intensity of the swinging and whipping action respectively can be selectively chosen to a particular lure or bait employed.

The foregoing and other advantages and features of the invention will be apparent from the following more particular description of preferred embodiments of the invention.

BRIEF DESCRIPTION OF THE DRAWINGS

FIG. 1 is a plan view showing the instant invention, i.e. the fishing apparatus mounted in operative disposition on a boat;

FIG. 2 is an elevational view of the first embodiment of the apparatus;

FIG. 3 is a bottom view of the first embodiment;

FIG. 4 is a sectional view taken substantially at line 4—4 of FIG. 2;

FIG. 5 is a perspective view of a holder operative to support and retain a fishing pole;

FIG. 6 is a fragmentary sectional view of a flexible linkage portion of the first embodiment;

FIG. 7 is an elevational view taken at line 7—7 of FIG. 3;

FIG. 8 is a perspective view of the linkage mechanism of the first embodiment;

FIG. 9 is the bottom view of the first embodiment showing the flexible linkage in a deflected position;

FIG. 10 is a bottom view of a second embodiment;

FIG. 11 is a perspective view of the linkage mechanism of the second embodiment; and FIG. 12 is an electrical schematic diagram of the electric motor and associated controls coupled to a source utilized in both embodiments.

DESCRIPTION OF THE PREFERRED EMBODIMENTS

Turning attention to FIG. 1, the first embodiment of the instant invention, namely an apparatus, generally designated 10, for imparting a cyclic movement or action to a fishing pole 11, is shown in typical operating position on a boat 12.

As best seen in FIGS. 2 and 3 the apparatus 10 comprises a housing 14 which also serves as a supporting framework for the operating components of the apparatus as explained hereinafter. The housing 14 comprises an elongated wall 15 merging into longitudinal side walls 16 and 17 which depend downwardly in flanking relation from the top wall 16. Disposed at each end of the top and side walls are end walls 18 and 19 which have been secured to the adjacent top and side walls by suitable means such as welding. Mounting flanges 21 and 22 with slots 23, 24 have been affixed to the end walls 18 and 19 respectively, and serve to provide a means by which the apparatus can be secured in place on a boat as indicated in FIG. 1. It can be seen that the side walls 16, 17 and end walls 18, 19 form a cavity or space 25 therebetween.

A motor housing 26 is centrally mounted and secured to the housing 14 by bolts 27 some of which are shown in FIG. 3. The motor housing 26 houses a universal type motor schematically indicated as 28 in FIG. 12. The motor 28 has a driven shaft 29 which extends downwardly through the top wall 15 into the space 25. A switch 30 and a variable impedance device 31 having a control knob 32 are mounted conveniently in the side wall 16. The universal motor is commonly known in the art as a series type motor and is characteristically operable from either direct current (D.C.) or alternating current (A.C.) sources, and has speed characteristics easily controlled by varying the voltage impressed across the motor terminals. Referring to FIG. 12, it can be seen that a power source 34 is depicted diagramatically and can be either a direct or alternating current. One terminal of the source is connected by conductor 35 to the switch 30 which in turn is connected through conductor 36 to the input of the variable impedance 31. The output from the variable impedance and the other terminal of the source are connected across the motor 28 by lines 37 and 38 as shown. The variable impedance 31 may be a rheostat which would be suitable for both D.C. and A.C. sources. However it is contemplated that other known devices capable of selectively varying the voltage impressed across the motor could be used.

A pair of essentially identical fishing pole holders generally designated 40 are diametrically mounted on the top wall 15 adjacent the end walls 18 and 19. Each holder comprises a pole retaining and supporting tube 41 having a partial cut away portion 42 defining upwardly extending walls 43 and 44 which merge together forming a semicylindrically shaped concavity 45. The wall 44 extends upwardly past the curvature of the tube 41 and has a slot 46 useful for retaining ties (not shown) when the diameter of the pole is such that it does not extend above the walls 43 and 44. A wedge shaped member 47 is affixed to the bottom of the tube 41 and the top of a support block 48. It can be seen that the member 47 positions the attitude of the supporting tube 41 so that a fishing pole supported and retained therein will extend outwardly in an inclined orientation relative to the top wall 15. The support block has an internal bore 50 intersected by a threaded bore 51. A shaft 52 is retained in the internal bore 50 by a set screw 53 threaded into the bore 51 such that it engages a groove 52a in an end portion of the shaft 52 to thereby secure the shaft thereto. The support block 48 is positioned on a base plate 55 having a centrally located stud portion 56. The base plate and stud portion (55, 56) have a common bore 57 in which has been pressed a bushing 58. The stud portion 56 is placed through a close fitting hole 13 in the top wall 15 and secured thereto by screws 59 extending into the aligned-threaded bores 55a. The supporting block 48 with the shaft 52 extending therefrom is placed on the base plate 55 with the shaft extending downwardly into the space 25. The lower end of the shaft has an internal threaded bore 62.

Referring again to FIG. 3, there is shown a linkage assembly 65 which is operative to provide a unique drive from the motor 28 to the fishing pole holders 40. As best seen in FIG. 8, the linkage assembly comprises drive crank arm 66 affixed to the motor shaft 24 in radial extension therefrom. A flexible and resilient drive arm 67 has one end pivotally connected by pin 68 to the crank arm 66 in spaced relation from the motor shaft 29 thereby producing an eccentric thereat. The flexible drive arm 67 extends along the wall 16 to pivotally connect at the other end thereof to a rocker arm 69 by means of pin 70. The rocker arm 69 is centrally connected to the shaft 52 of the pole holder 40 by means of a bolt 63 threaded into the bore 62 of the shaft. The bolt is sufficiently tightened so that the rocker arm 69 is positioned as shown and when driven is effective to impart a rocking movement of the shaft 52 about its principal axis. The other end of the rocker arm 69 is pivotally connected by pin 71 to one end of a tie arm 72 extending along wall 17 to the fishing pole holder at the other end of the housing. The other end of the tie arm 72 pivotally connects to one end of an arm 73 by means of a pin 74. Here again the arm 73 is affixedly connected to the shaft 52 of the holder at that end by means of a bolt threaded into the bore 62. The arm 73 is positioned substantially as shown in FIG. 4 and is effective to impart a rocking movement of the shaft 52 about its axis.

Returning again to the flexible arm 67 which has unique functioning characteristics in the apparatus, it can be seen that the arm comprises two substantially rigid members 75 and 76 having one of their ends pivotally connected in the alternative to the crank arm 66 and rocker arm 69. Each of Each of the members (75, 76) terminates at its other end to define a distal end face 78 and 79, respectively. The faces 78, 79 terminate such that a gap is provided therebetween. Centrally located and welded to each face is a resilient strut 81 preferably made from spring steel (see FIG. 6). A coil spring 82 is fastened at each end respectively to the faces 78 and 79 by means such as welding. It can be appreciated that the above described construction of the arm 67 produces a flexible and resilient elongated member which can deflect and bend between its ends in an energy storing manner which when released will snap back into its original elongated shape.

A cam element 83 is mounted on the edge of the arm member 75 facing wall 16 at a location adjacent the end pivotally connected to the crank arm 66. The cam element has a face 84 oriented relative to the wall 16 as shown in FIGS. 4 and 9. Disposed on the wall for engagement with the cam element 83 is a roller 85 rotatably mounted on an axle 86 which is held by a yoke 87 in substantial parallel relation to the wall 16.

During the operation of the instant invention, the switch 30 is turned on and the motor 28 is energized. It is assumed that the variable impedance 31 is set to provide for motor shaft rotation. As the motor shaft 29 rotates, the crank arm 66 moves in the direction indicated by the arrow designated 'A' (FIG. 9). The rotational motion produces reciporcating movement in the flexible drive arm 67. The arm 67 has an elliptical motion angularly toward the wall 16 in a direction toward the end wall 19. When this occurs, the cam element 83 approaches the roller 85, and as this happens, the roller engages the oblique face 84 of the cam element as shown in FIG. 7. The roller 85 rolls upon the face 84 producing a bending force on the flexible arm 67 such that flexing or bending of the arm occurs as shown in FIG. 9. As the crank arm 66 continues to drive the arm 67 toward the end wall 63, it can be appreciated that the roller will roll off the face 84 thereby abruptly releasing the resilient arm 67 causing a sudden thrust on the rocker arm 69 in the direction as indicated by arrow 'B' which is transmitted through the fishing pole holder to a pole retained therein creating a whipping action at the free end of the pole.

This same action is transmitted to the other holder 40 by means of the rigid tie arm 72 and arm 73. The crank arm 66 then continues to rotate about the motor shaft axis producing a pendulating motion at the rocker arm 69 including a rotating oscillating motion on the fishing pole holders 40 until the cam element 83 and roller 85 are again driven into engagement. This aforedescribed motion on the holders 40 produces a novel cyclic action on the free end of any fishing poles retained and supported in the holders. This motion and action is obviously translated to lures and bait secured in the normal manner from lines depending from the free ends of the poles.

It should also be noted that the frequency and intensity of the whipping action and rotary oscillating motion can be selectively controlled merely by adjusting the speed of the motor 28 through manipulation of the knob 32 of the variable impedance 31 which controls the magnitude of the voltage impressed across the motor.

The second embodiment is shown in FIGS. 10 and 11. Since this embodiment is substantially the same in structural make-up as the first described embodiment, many of the components are essentially the same as those used in the first embodiment hereinbefore described. Therefore, wherever the same components have been used in these embodiments, the identical reference numerals will be applied thereto and it is to be assumed that where such identical reference numerals are employed, the components referred thereto will have essentially the same structural make-up and function as described for the first embodiment.

It can be seen that this embodiment includes the housing 14, the motor 28 and diametrically disposed fishing pole holders 40 journaled and retained in the top wall 15 of the housing 14 as in the first embodiment. However, the side wall 16 has mounted thereon a box-like structure 90 for holding the variable impedance 31 and switch 30 to provide clearance in the cavity 25 for a linkage mechanism 90 used in this embodiment. As best seen in FIG. 11, the linkage mechanism 90 comprises a crank arm 91 radially mounted on the motor shaft 29 and constrained to rotate therewith. A pair of tie arms 92 and 93 each having one of their ends pivotally mounted at a common place on the crank arm 91 by a pin 94 to thereby produce an eccentric thereat. The other end of tie arm 92 is pivotally connected by pin 95 to a rocker arm 96 which is affixed to the shaft 52 of the holder 40 at that end of the housing. The other tie arm 93 extends to the other end of the housing and pivotally connects by a pin 98 to a rocker arm 97 which is also secured to the shaft 52 of the holder at that other end.

It can be appreciated that as the crank arm 91 is rotated about, the eccentric relationship will produce a reciprocating motion in each of the tie arms 92 and 93. This reciprocating motion will cause each of the rocker arms 96, 97 to move in a pendulating motion, as indicated by the arrows in FIG. 10. This pendulating motion is translated to the fishing pole holders 40 as an oscillatory rotary motion by the shafts 52. The frequency of the oscillation can be controlled by adjusting the variable impedance 31 to a desired setting. The effect of such an adjustment on the motor 20 is the same as hereinbefore described for the first embodiment.

It should also be noted that both the first and second embodiments were disclosed with two fishing pole holders 40. It is obvious that in each instance, the apparatus would work equally well if only one holder were employed.

It will be appreciated that the described embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood that any particular structure and functional aspect emphasized herein is not intended to exclude but rather to suggest such other modifications and adaptations as fall within the spirit and scope of the invention.

What is claimed is:

1. An apparatus operative to retain and support a fishing pole and impart a horizontal pendulating motion to the free end thereof, comprising a housing; a fishing pole holder mounted on said housing for rotation about a substantially vertical axis and operative to retainably support a fishing pole placed therein; linkage means including a rocker arm secured to said holder such that a pendulating motion of said rocker arm imparts an oscillating rotary motion to said holder; drive means including a universal type motor having a driven rotatable shaft; a crank arm fixed at one end to said driven shaft for rotation therewith; and a tie arm pivotally interconnecting the other free end of said crank arm and a free end of said rocker arm whereby said crank arm is operative to produce a pendulating movement in said rocker arm upon rotation of said motor shaft.

2. The invention as recited in claim 1 wherein impedance means are coupled to said motor for controlling the voltage impressed across the motor from a suitable source to selectively adjust the rotary speed of said driven shaft and thereby to determine the frequency at which said holder oscillates.

3. The invention as recited in claim 2, wherein said fishing pole holder comprises:
   a tubular member having a cut away portion defining a semicylindrical segment for receiving a fishing pole therein;
   a supporting block having a centrally disposed shaft extending journaled in said housing and connected to said rocker arm; and
   a wedged shaped member disposed between said tubular member and said supporting block effecting an inclined attitude of said tubular member such that a fishing pole retained therein will extend upwardly and outwardly from said housing.

4. The invention as recited in claim 1 wherein said tie arm comprises a pair of arm members in lengthwise spaced end-to-end relationship to define a gap and with one of said pair of arm members connected at one end to said crank arm and the other of said pair of arm members connected at the end remote from said one end of said one of said pair of arm members to said rocker arm; resilient means spanning said gap and connecting said pair of arm members; and means acting upon said arm members to effect a deflection and then an abrupt release of said tie arm to produce a sudden accelerated pendulating motion on said rocker arm which effects a whipping action on a pole retained in said holder.

5. An apparatus operative to retain a fishing pole and move the free end thereof in a back and forth cyclic annular pattern of movement which includes a whipping motion during at least a part of the cycle comprising:
   a housing;
   a holder operative to retain a fishing pole, said holder mounted on said housing and journaled therein for rotatable movement relative to said housing;
   means for driving said holder;
   means for interconnecting said drive means and holder, said means operative to provide a drive train from said drive means to said holder effective to impart a cyclic oscillatory movement to the said holder; and
   said interconnecting means including resiliently bendable thrust means for producing a substantial rate of change of velocity of the holder during at least a part of the cyclic whereby a whipping action is produced at the free end of a fishing pole retained by the holder.

6. The invention as recited in claim 5 wherein said drive means includes a rotatably driven shaft; said interconnecting means including a crank arm connected to said shaft producing an eccentric motion thereat, and a rocker arm operatively connected to said holder to impart the cyclic oscillatory movement thereto; and said thrust means disposed in operative interconnection between said crank arm and rocker arm.

7. The invention as recited in claim 6 wherein said thrust means comprises, a resilient drive arm having a pair of rigid arm elements each alternatively having one end thereof pivotally connected to said crank arm and said rocker arm such that a gap is defined therebetween, resilient means disposed across said gap end interconnecting said arm elements, means for engaging said drive arm to effect a bending at said gap and a sudden releasing thereof to thereby produce a thrust on said rocker arm which produces the substantial change of acceleration to said holder.

8. The invention as recited in claim 7 wherein said holder comprises, a tubular member having a cut away portion defining a semicylindrical cavity for receiving a fishing pole therein, a supporting block having a shaft extending therefrom, said shaft journaled in said housing and connected to said rocker arm, a member disposed between said tubular member and supporting block to inclininigly orient said tubular member relative to said housing wherein a fishing pole retained therein extends upwardly and outwardly from said housing.

9. The invention as recited in claim 7 wherein said drive means comprises; an electric motor of the universal type; a variable impedance means coupled to said motor being operative to vary the voltage impressed across the motor and thereby selectively adjust the speed of the rotatably driven shaft wherein the frequency of the annular pattern of movement and the intensity of the thrust can be chosen for a particular bait and lure.

10. The invention as recited in claim 8 wherein said apparatus includes a second holder essentially the same as the other holder and diametrically disposed on said housing relative to the other holder, said second holder having a shaft, an arm connected to said shaft of the second holder, a tie arm pivotally interconnecting said rocker arm and said arm wherein substantially the same annular pattern of movement imparted to the other holder is transmitted to the second holder.

* * * * *